(12) United States Patent
Valensa et al.

(10) Patent No.: US 7,548,683 B2
(45) Date of Patent: Jun. 16, 2009

(54) COOLANT CONDITIONING SYSTEM AND METHOD FOR A FUEL PROCESSING SUBSYSTEM

(75) Inventors: Jeroen Valensa, New Berlin, WI (US); Mark G. Voss, Franksville, WI (US)

(73) Assignee: Modine Manufacturing Company, Racine, WI (US)

( * ) Notice: Subject to any disclaimer, the term of this patent is extended or adjusted under 35 U.S.C. 154(b) by 1185 days.

(21) Appl. No.: 10/765,026

(22) Filed: Jan. 26, 2004

(65) Prior Publication Data

US 2005/0164060 A1    Jul. 28, 2005

(51) Int. Cl.
*H05B 3/60* (2006.01)
*H01M 8/04* (2006.01)

(52) U.S. Cl. .......................................... 392/311; 429/26

(58) Field of Classification Search ................. 392/311, 392/312, 313, 322, 323, 324, 325, 326, 327, 392/328, 329, 330, 331, 332, 333, 334, 335, 392/336, 337, 338; 429/26, 12, 13, 14, 15, 429/16, 17, 18, 19, 20, 21, 22, 23, 24, 25
See application file for complete search history.

(56) References Cited

U.S. PATENT DOCUMENTS

| | | | | |
|---|---|---|---|---|
| 6,607,854 B1 * | 8/2003 | Rehg et al. | .................... | 429/13 |
| 6,656,622 B2 * | 12/2003 | Grasso | ......................... | 429/26 |
| 7,085,483 B2 * | 8/2006 | Terashima et al. | .......... | 392/485 |
| 2002/0164512 A1 * | 11/2002 | Grasso | ......................... | 429/26 |

FOREIGN PATENT DOCUMENTS

| | | |
|---|---|---|
| EP | 0 213 840 A2 | 3/1987 |
| EP | 1 369 946 A1 | 12/2003 |
| JP | 7-240223 | 9/1995 |
| JP | 09022715 | 1/1997 |
| JP | 2002047002 | 12/2002 |

* cited by examiner

*Primary Examiner*—Daniel L Robinson
(74) *Attorney, Agent, or Firm*—Michael Best & Friedrich LLP

(57) ABSTRACT

A coolant conditioning system is provided for supplying a coolant flow to a fuel processing subsystem. The coolant conditioning system includes a coolant preheater to transfer heat from a reformate flow to the coolant flow, a heater to selectively add heat to the coolant flow in response to the coolant flow dropping below a minimum temperature, at least one outlet flow path to provide a portion of the coolant flow to at least one fuel processing subsystem, and a return flow path to return a remainder of the coolant flow to a storage tank. The coolant conditioning system is dynamically controllable to provide a portion of the coolant flow above a minimum temperature to reduce or prevent condensation of the reformate flow in selected components of the fuel processing subsystem that receive the portion of the coolant flow.

11 Claims, 3 Drawing Sheets

COOLANT CONDITIONING SYSTEM AND METHOD FOR A FUEL PROCESSING SUBSYSTEM

FIELD OF THE INVENTION

This invention relates to coolant systems for fuel processing subsystems for fuel cell systems, and in more particular applications, to water conditioning systems for a reformate flow for fuel cell systems such as polymer electrolyte fuel cell systems, such as proton exchange membrane (PEM) fuel cell systems.

BACKGROUND OF THE INVENTION

In many PEM fuel cell systems, a fuel such as methane or a similar hydrocarbon fuel is converted into a hydrogen-rich stream for the anode side of the fuel cell. In many systems, humidified natural gas (methane) and air are chemically converted to a hydrogen-rich stream known as reformate by a fuel processing subsystem of the fuel cell system. This conversion takes place in a reformer where the hydrogen is catalytically released from the hydrocarbon fuel. A common type of reformer is an Auto-thermal Reactor (ATR), which uses air and steam as oxidizing reactants. As the hydrogen is liberated, a substantial amount of carbon monoxide (CO) is created which must be reduced to a low level (typically less than 10 ppm) to prevent poisoning of the PEM membrane.

The catalytic reforming process consists of an oxygenolysis reaction with an associated water-gas shift [$CH_4 + H_2O \rightarrow CO + 3H_2$, $CO + H_2O \rightarrow CO_2 + H_2$] and a partial oxidation reaction [$CH_4 + \frac{1}{2}O_2 \rightarrow CO + 2H_2$]. While the water-gas shift reaction removes some of the CO from the reformate flow stream, the overall reformate stream will always contain some level of CO, the amount being dependent upon the temperature at which the reforming process occurs. After the initial reactions, the CO level of the reformate flow is well above the acceptable level for the PEM fuel cell. To reduce the CO concentration to within acceptable levels, several catalytic reactions will generally be used in the fuel processing subsystem to remove CO in the reformate flow. Typical reactions for reduction of CO in the reformate flow include the aforementioned water-gas shift, as well as a selective oxidation reaction over a precious metal catalyst (with a small amount of air added to the reformate stream to provide oxygen). Generally, several stages of CO cleanup are required to obtain a reformate stream with an acceptable CO level. Each of the stages of CO cleanup requires the reformate temperature be reduced to precise temperature ranges so that the desired catalytic reactions will occur and the loading amount of precious metal catalyst can be minimized.

In this regard, liquid-cooled heat exchangers are frequently employed to control the reformate temperature at each stage because of their compact size when compared to gas-cooled heat exchangers. Further, because liquid water entering the fuel processing subsystem must be heated so that it can be converted to steam for the reforming reactions, it is thermally efficient to use process water as the liquid coolant for the heat exchangers to cool the reformate flow prior to CO removal. However, such an approach can be difficult to implement.

For example, because a liquid coolant is generally at a much lower temperature than the reformate that is being cooled, the problem of condensation may occur in the reformate flow. Particularly, if process water is the liquid coolant. This problem is especially important because condensed liquids, such as water, in the reformate stream can deactivate the catalyst that is utilized in CO removal or hydrogen purification units in fuel processing subsystems.

SUMMARY OF THE INVENTION

In accordance with one form of the invention, a coolant conditioning system is provided for supplying a coolant to at least one fuel processing subsystem of a fuel cell system. The coolant conditioning system includes a coolant storage tank and a pump to supply a liquid coolant flow. The coolant conditioning system further includes at least one coolant preheater connected to a reformate flow to transfer heat from the reformate flow to the coolant flow, the at least one coolant preheater includes a coolant inlet and a coolant outlet. The coolant conditioning system also includes a heater connected to the coolant outlet to selectively add heat to the coolant flow when the temperature of the coolant flow at the coolant outlet falls below a minimum temperature, the heater includes a heater inlet for the coolant and a heater outlet for the coolant. The coolant conditioning system further includes at least one outlet flow path to provide a portion of the coolant flow from the heater outlet to the at least one fuel processing subsystem, and a return flow path to return a remainder of the coolant flow from the heater outlet to the storage tank.

In a preferred form, the coolant is water.

According to one form, the at least one outlet flow path provides a portion of the coolant flow from the heater outlet to a heat exchanger of the fuel processing subsystem.

In one form, the coolant conditioning system further includes at least one outlet flow path to provide a portion of the coolant flow from the heater outlet to at least one shift reactor and/or selective oxidation units of the fuel processing subsystem.

In accordance with one form, the pump supplies the liquid coolant at a desired flow rate.

According to one form, the pump supplies the liquid coolant at a constant flow rate.

In accordance with one form, the flow rate of the portion of the coolant flow under normal operating conditions is less than the desired flow rate provided by the pump.

In one form, the coolant conditioning system further includes at least one pressure regulator downstream from the heater to maintain the portion of the coolant flow to the at least one fuel processing subsystem at a desired pressure.

According to one form, the minimum temperature is the dewpoint temperature of the reformate flow.

In accordance with one form, the coolant conditioning system further includes a temperature sensor to measure the temperature of the coolant flow exiting the preheater.

In one form, the heater is responsive to a signal from the temperature sensor.

According to one form, the heater is an electric heater.

In one form, the coolant conditioning system further includes a makeup flow path connected to the storage tank to provide additional coolant flow to the storage tank form a coolant source.

In accordance with one form, the coolant source is a recycle flow from the fuel cell system.

According to one form, a method is provided for operating a pressurized coolant supply for use with at least one fuel processing subsystem of a fuel cell system.

In one form, the method includes the steps of:

flowing a coolant from a coolant storage source through a first flow path of a coolant preheater;

flowing a reformate through a second flow path of the coolant preheater;

transferring heat from the reformate to the coolant in the coolant preheater;

flowing the coolant from the coolant preheater to a heater;

selectively adding heat to the coolant at the heater when the temperature of the coolant drops below a minimum temperature;

flowing a portion of the coolant to the at least one fuel processing unit; and returning the remainder of the coolant to the storage source.

In a preferred form, the coolant is water.

According to one form, the coolant is flowed at a desired rate through the first flow path.

In one form, the coolant is flowed at a constant rate through the first flow path.

In accordance with one form, the flow rate of the portion of the coolant under normal operating conditions is less than the desired flow rate.

In one form, the method further includes the step of regulating the pressure downstream from the heater to maintain the portion of the coolant to the at least one fuel processing subsystem at a desired pressure.

According to one form, the minimum temperature is the dewpoint temperature of the reformate.

In accordance with one form, the method further includes the step of measuring the temperature of the coolant exiting the preheater.

In one form, the method further includes the step of having the heater respond to the temperature of the coolant exiting the preheater.

According to one form, the method further includes the step of flowing a makeup flow to the coolant storage source from a coolant source.

In accordance with one form, the coolant source is flowed from a recycle stream of the fuel cell system.

Other objects, advantages, and features will become apparent from a complete review of the entire specification, including the appended claims and drawings.

DETAILED DESCRIPTION OF THE PREFERRED EMBODIMENTS

Figure 1:
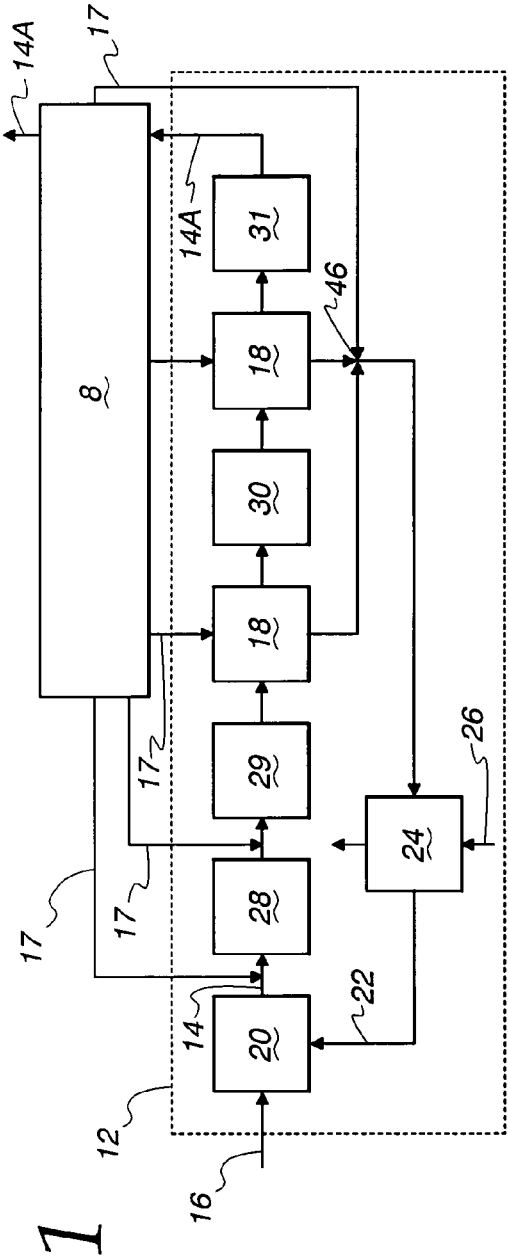
FIG. 1 is a diagrammatic representation of a fuel processing subsystem including a coolant conditioning system and method embodying the present invention.

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

As seen in FIG. 1, a coolant conditioning system 8, in the preferred form of a process water conditioning system 8, is provided for use with a fuel processing subsystem, shown schematically at 12 for producing a reformate flow 14 from a hydrocarbon flow 16 and for reducing a level of carbon monoxide (CO) in the reformate flow 14 for use in a proton exchange membrane fuel cell system (not shown). As used in the specification, the phrase fuel flow is meant to encompass both the hydrocarbon flow 16 and the reformate flow 14. The process water conditioning system 8 provides one or more process water outlet flow paths 17 to the fuel processing subsystem 12. The number of outlet flow paths 17 to the fuel processing subsystem 12 may vary according to the fuel processing subsystem 12 requirements, and may be as few as one outlet flow path 17.

A pair of heat exchangers 18 are provided for use in the fuel processing subsystem 12 to cool the reformate flow 14 to a desired temperature range for use in the next component in the fuel processing subsystem 12. While two of the heat exchangers 18 are shown, it should be understood that the heat exchangers 18 do not depend on each other and can operate independently. Additionally, any number of heat exchangers 18 can be utilized as required by the fuel processing subsystem 12. For example, some subsystems 12 may require a single heat exchanger 18, while others may require three or more of the heat exchangers 18.

In the illustrated embodiment, the fuel processing subsystem 12 includes an auto-thermal reformer 20. Commonly used methods called steam reforming and catalytic partial oxidation are used to produce the reformate flow 14 from the hydrocarbon flow 16 in the auto-thermal reformer 20. The reactions consist of an oxygenolysis reaction, a partial oxidation, and a water-gas shift [$CH_4+H_2O \rightarrow CO+3H_2$, $CH_4+\frac{1}{2}O_2 \rightarrow CO+2H_2$, $CO+H_2O \rightarrow CO_2+H_2$]. For these catalytic reactions to occur, the reactants must be brought to an elevated temperature typically in excess of 500° C. As shown in the first reaction, superheated steam flow 22 is used to partially elevate the temperatures of the reactants entering the auto-thermal reformer 20. As in most fuel processing subsystems for fuel cell systems, the necessary heat to create and/or superheat the steam flow 22 must be added from an external source such as a heater or, as shown in FIG. 1, by burning an anode tail gas stream 26 and transferring heat in a heat exchanger 24 to create the steam flow 22.

As shown in the above mentioned reactions, CO is created in the reforming process. The CO created must be removed before entering a fuel cell because it is poisonous to the membrane, limiting the fuel cell performance and lifetime. The amount of CO created in the reforming reactions is highly dependent upon the reaction temperature. At higher temperatures, the reactions yield more hydrogen gas useful in the fuel cell, but also yield more poisonous CO. In order to eliminate the poisonous CO from the reformate flow 14, CO elimination stages may be utilized.

In the illustrated embodiment of FIG. 1, after the hydrocarbon flow 16 is used to produce the reformate flow 14 in the auto-thermal reformer 20, the reformate flow 14 is flowed to at least one water-gas shift reactor 28. The water-gas shift 28 is utilized to further remove poisonous CO from the reformate flow 14 and create more hydrogen gas for use in the fuel cell system. The water-gas shift 28 requires water as shown in the water-gas shift reaction [$CO+H_2O \rightarrow CO_2+H_2$]. When required, additional water may be added at the water-gas shift 28 to maintain the water-gas shift reaction. The additional water may come from the process water conditioning system 8 via outlet flow paths 17. Additionally, multiple water-gas shifts 28 and 29 may be utilized to further reduce the amount of poisonous CO in the reformate flow 14, where outlet flow paths 17 provide water as required by the reactions.

Even after multiple water-gas shift reactions 28 and 29, the reformate flow 14 still typically contains excessive amounts of poisonous CO in the reformate flow 14. To eliminate more of the poisonous CO, additional devices such as at least one selective oxidizer 30 may be utilized. Selective oxidation reactions typically require a small amount of air to be added to the reformate flow 14 to provide oxygen as required by the selective oxidation reaction [$CO+\frac{1}{2}O_2 \rightarrow CO_2$]. Selective oxidation reactions typically occur over a precious metal catalyst. For the catalytic reaction to occur, the reformate flow 14 must be reduced to a desired temperature range by the associated heat exchanger 18 to optimize the efficiency of the precious metal catalyst. Typically, selective oxidation occurs in a temperature range of 130° C. to 180° C. Highly efficient selective oxidation occurs over a much narrower temperature range depending upon the catalyst.

Multiple units may oftentimes be necessary to remove sufficient CO from the reformate flow 14. As illustrated in FIG. 1, multiple heat exchangers 18 and multiple selective oxidizers 30,31 are utilized to remove CO from the reformate flow 14. Typically in this process, the flow rate of the portion of the process water flow is much larger in the upstream (in relation to reformate flow) heat exchanger 18 than the flow rate of the portion of the process water flow in the downstream heat exchanger 18 because the temperature of the reformate flow 14 entering the upstream heat exchanger 18 is much higher than the temperature of the reformate flow 14 entering the downstream heat exchanger 18. It is irrelevant to the overall system thermal efficiency if more heat is removed at one heat exchanger 18 than another because the portions of the process water flow are preferably recycled back into the fuel processing subsystem 12, as shown at 46, and used for the steam flow 22 in the auto-thermal reformer 20.

In the embodiment of FIG. 1, multiple selective oxidizers 30 and 31 are utilized and operate at different desired temperature ranges from each other to remove poisonous CO, preferably to a level less than 10 ppm in the reformate flow 14. Portions of the process water flow are directed via the outlet flow paths 17 to each of the reformate cooling systems 18 to cool the reformate flow 14 to within the desired temperature range for the respective selective oxidizers 30 and 31.

While it is optimal to have large temperature gradients between the reformate flow 14 and the portions of the process water flow from the outlet flow paths 17, it is desirable to maintain the portions of the process water flow from the outlet flow paths 17 at or above a minimum temperature to prevent water in the reformate flow 14 from condensing. This aspect is necessary because liquid water deactivates the catalyst generally used in selective oxidizers 30 and 31. Thus, if liquid water were to come into contact with the catalyst contained in selective oxidizers 30 and 31, the performance of the CO removal reactions would be compromised.

Figure 2:
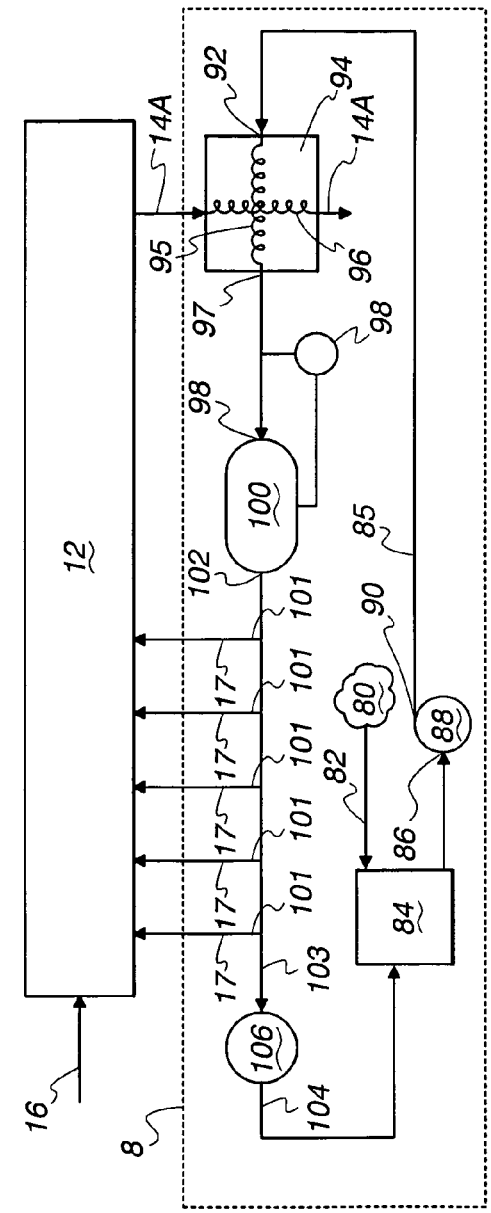
FIG. 2 is a diagrammatic representation of the coolant conditioning system and method of FIG. 1.

To help maintain the desired temperature range for the portions of the process water flow from the outlet flow paths 17, the process water conditioning system 8 and method of the present invention are utilized. A more detailed depiction of the process water conditioning system 8 is shown in FIG. 2.

In one preferred embodiment, a process water source 80 provides a makeup flow path 82 for liquid process water to a suitable process water storage source such as a process water storage tank 84. A process water flow 85 flows from the process water storage tank 84 to a pump inlet 86, wherein a pump 88 pumps the process water flow 85 through a pump outlet 90. The process water flow 85 flows from the pump outlet 90 to a water preheater inlet 92 of a water preheater 94. The process water flow 85 flows from the preheater inlet 92 through a process water flow path 95, where it is heated by the reformate flow 14A passing through a reformate flow path 96. The process water flow 85 then exits the preheater 94 via a preheater outlet 97. From the preheater outlet 97, the process water flow 85 flows to a heater inlet 98 of a heater 100 that selectively adds heat to the process water flow 85 when the temperature of the process water flow 85 falls below a minimum desired temperature. In this regard, in one preferred embodiment, a temperature sensor 99 is located to sense the temperature of the process water flow 85 either upstream or downstream of the heater 100 to provide a temperature signal to the heater 100 to signal when additional heat is required for the process water flow 85. Alternatively, in place of the temperature sensor 99, the heater 100 may contain an internal thermostat (not shown) for regulating the process water temperature by selectively adding heat to the process water flow 85. After flowing through the heater 100, the process water flow 85 exits the heater 100 via a heater outlet 102. From the heater outlet 102, the process water flow 85 may be split into at least one portion 101 and a remainder 103. In the embodiments shown in FIGS. 1 and 2, the process water flow 85 is split into five portions 101 via outlet flow paths 17, and the remainder 103 is directed back to the tank 84 via a return flow path 104. It should be understood that the portion 101 of the process water flow 85 may be delivered to the fuel processing subsystem 12 via one outlet flow path 17, one outlet flow path 17 that further divides into multiple outlet flow paths 17, or even multiple outlet flow paths 17 that further divide into additional outlet flow paths 17. As illustrated in FIG. 2, the remainder 103 of the process water flow 85 preferably flows through a back pressure regulator 106 so as to maintain the pressure of the portions 101 in the outlet flow paths 17 at a desired pressure. The return flow path 104 returns the remainder 103 of the process water flow 85 from the back pressure regulator 106 to the process water storage tank 84 where it is combined with additional process water from the process water source 80.

The location of the preheater 94 with respect to the reformate flow 14 may be varied according to the heat requirements of the fuel processing subsystem 12 and the physical design of the process water conditioning system 8. For example, as illustrated in FIG. 1, the preheater 94 is located downstream from the second selective oxidizer 31 with respect to the reformate flow 14A, which for purposes of clarity has been labeled 14A when exiting the selective oxidizer 31. This location is optimal for this embodiment, after the selective oxidizer 31, the reformate flow 14A will flow to the fuel cell system (not shown) which requires the reformate flow 14A to be at a lower temperature than the temperature of the reformate flow 14A exiting the selective oxidizer 31 and therefore, heat must be removed from the reformate flow 14A regardless of the heat requirements of the process water conditioning system 8. Additionally, the temperature of the reformate flow 14A, as it exits the selective oxidizer 31 is in the range of 130-180° C., which is an appropriate temperature range to heat the process water flow 85. Furthermore, because condensation can occur in the preheater 94 as a result of the process water flow inlet temperature to the preheater 94 being below the dew point of the reformate flow 14A entering the preheater 94, the location of the preheater 94 downstream from any catalyst is preferred. While FIG. 1 illustrates a preferred location for the preheater 94 relative to the reformate flow 14 of the fuel processing subsystem 12, there are other possible locations. For example, the preheater 94 may be located before or after the selective oxidizer 30, before or after either of the heat exchangers 18, before or after either of the water-gas shifts 28 and 29, or before or after the auto-thermal reformer 20.

Similarly to the preheater 94, the location of the heater 100 may be varied according to the requirements of each particular fuel processing subsystem 12 and the process water conditioning system 8, or may replace the preheater 94 altogether. As illustrated in FIG. 2, the heater 100 is located immediately downstream from the preheater 94, but the heater 100 could be located upstream from the preheater 94 or after any other units (not shown) so long as the heater 100 is located between the tank 84 and the outlet flow paths 17. Preferably, under normal nontransient operating conditions, the heater 100 will not be required to add heat to the process water flow 85 and the reformate flow 14A will transfer sufficient heat in the preheater 94 to maintain the process water flow 85 at or above the desired minimum temperature. Thus, in the preferred embodiment, the heater 100 will be required to add additional heat to the process water flow 85 only under transient operating conditions. Such transient conditions include when the fuel processing subsystem 12 initially starts up and when the fuel processing subsystem 12 changes between a higher load setting and a lower load setting.

Additionally, the back pressure regulator 106 is merely one example of pressure regulating means capable of providing the portion 101 of the process water flow 85 at a desired pressure. The back pressure regulator 106 may be any suitable device known in the art capable of providing the portion 101 of the process water flow 85 at a desired pressure. Furthermore, while the back pressure regulator 106 is shown in FIG. 2 located downstream of the outlet flow paths 17, the location of the back pressure regulator 106 may also be varied according to the requirements of each particular fuel processing subsystem 12 and the process water conditioning system 8.

In one embodiment of the present invention, the pump 88 provides the process water flow 85 at a desired flow rate which is preferably a constant flow rate with the pump 88 being a constant flow rate pump. In this embodiment, the constant flow rate is greater than the combined flow rates through the outlet flow paths 17 under normal operating conditions, thereby assuring that the remainder 103 of the process water flow 85 can be provided through the return flow path 104. As the process water conditioning system 8 operates, the requirements of the outlet flow paths 17 may fluctuate. In order to compensate for the fluctuations in flow rates, the flow rate of the remainder 103 of the process water flow 85 will fluctuate accordingly. For example as the total flow rate of the portions 101 increases, the flow rate of the remainder 103 of the process water flow 85 will decrease a corresponding amount because the pump 88 provides the process water flow 85 at a constant flow rate. It should be understood that the pump 88 may provide the process water flow 85 at any suitable flow rate greater than the combined flow rate required by the outlet flow paths 17 under normal operating conditions. It should also be understood that in some applications it may be desirable for the flow rate provided by the pump 88 to not be constant and to vary as the process water flow 85 requirements of the fuel processing subsystem 12 varies.

As the portion 101 of the process water flow 85 is utilized in the fuel processing subsystem 12 via outlet flow paths 17, additional process water must be added to the process water conditioning system 8. Additional process water is added to the process water storage tank 84 from the process water source 80 via the makeup flow path 82. The process water source 80 is any process water source capable of providing sufficient process water to maintain the required process water flow 85 to the fuel processing subsystem 12 operating under full load. Preferably, the temperature of this makeup flow of process water through the flow path 82 should be less than the minimum desired temperature of the process water flow 85 directed to the outlet flow paths 17. Suitable process water sources can include a recycle flow from the fuel cell system, a water line, any other suitable coolant source, or a combination thereof.

Referring back to FIG. 1, it is shown that two outlet flow paths 17 provide portions 101 of the process water flow 85 to two heat exchangers 18. As discussed previously, the portion 101 of the process water flow 85 provided to the heat exchangers 18 is heated to maintain the portion 101 at or above a minimum temperature to prevent the reformate flow 14 from condensing and thereby deactivating the catalyst in the selective oxidizers 30 and 31. Thus, it is desirable to set the minimum temperature at or near to the dewpoint temperature of the water in the reformate flow 14 to prevent or reduce any localized cold spots in the heat exchangers 18 that can cause the water in the reformate flow 14 to condense. In highly preferred embodiments, the minimum temperature is set to be not much less than the dewpoint of the reformate flow 14 in the component, such as selective oxidizer 30, that is receiving the portion 101 of the process water flow 85. As described previously, liquid water can deactivate the catalyst utilized in the selective oxidizers 30 and 31. Further, it is also desired to maintain the process water flow 85 at a sufficiently low temperature to effectively remove heat from the reformate flow 14. If the temperature gradient between the reformate flow 14 and the portions 101 of the process water flow 85 in the heat exchangers 18 is not large enough, the reformate flow 14 may not be sufficiently cooled prior to exiting the heat exchangers 18. If the reformate flow 14 is not sufficiently cooled, the selective oxidizers may not be able to efficiently remove CO from the reformate flow 14 because the catalyst is optimized for selected temperature ranges. Therefore, in the embodiment illustrated in FIGS. 1 and 2, it is not only desired to maintain the process water flow 85 at or above a minimum temperature, but also not to overheat the process water flow 85, thereby wasting heat. In highly preferred embodiments, preheater 94 removes sufficient heat from the reformate flow 14A to ensure that a PEM fuel cell, if employed, is not damaged by the reformate flow 14A due to excessive temperatures. Thus, in these highly preferred embodiments, the preheater 94 serves the dual purpose of heating the process water flow 85 and cooling the reformate flow 14A to an appropriate temperature for use in a PEM fuel cell, with the cooling of the reformate flow 14A potentially being of more importance to the overall system than the preheating of the process water flow 85 such that the preheater 94 may be sized based on the cooling requirements for the reformate flow 14A.

Figure 3:
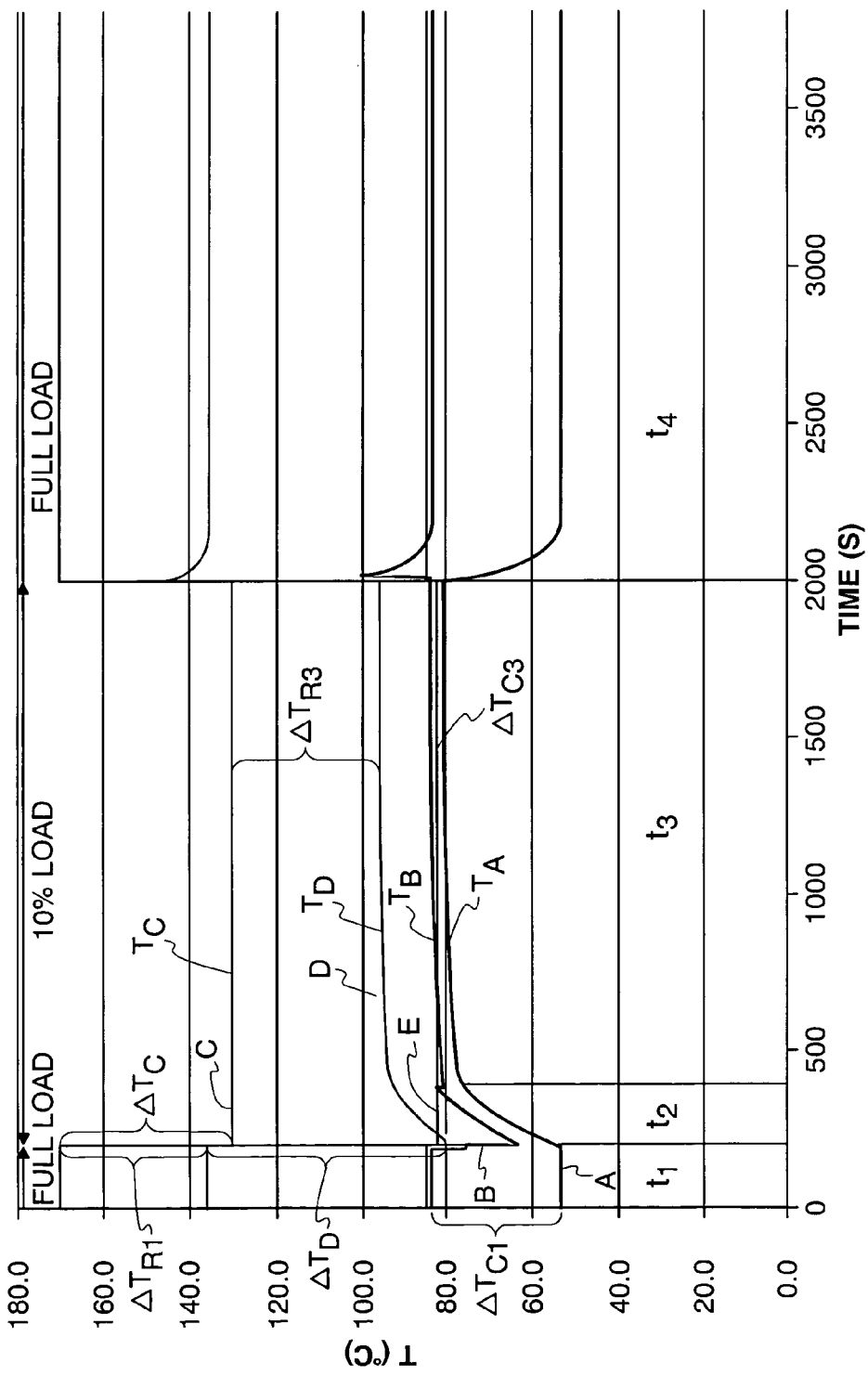
FIG. 3 is a graph depicting temperature profiles for the coolant flow, the reformate flow, and the reformate dewpoint under various loads.

A graph of the temperature profiles of the process water flow 85, the reformate flow 14A, and reformate dewpoint are illustrated in FIG. 3 as simulated by a computer model of one preferred form of the system 8. The simulation assumes that the temperature of the makeup process water flow through the makeup flow path 82 is 45° C., that the mass flow rate of the process water flow 85 is 26.7 g/s at full load and 10% load, the mass flow rate for all of the portions 101 combined is 20.7 g/s at full load and 2 g/s at 2% load, the mass flow rate of the reformate is 55.5 g/s at full load and 5.55 g/s at 10% load, that the fuel cell system is at steady operating state at full load at t=0 seconds, the flows and the reformate temperature are reduced to their 10% load values at t=200 seconds with the remainder of the fuel processing system assumed to change instantaneously, and the flows and the reformate temperatures being returned to their full loads state at t=2000 seconds, again with the rest of the fuel processing system being assumed to change instantaneously. The temperature profile of the process water flow 85 prior to entering the preheater 94 is illustrated by line A, i.e. the temperature of the process water in the tank 84. The temperature profile of the process water flow 85 after exiting the heater 100 is illustrated by line B. Line C represents the temperature profile of the reformate flow 14A prior to entering the preheater 94, and line D represents the temperature profile of the reformate flow 14A immediately after exiting the preheater 94. The reformate dewpoint temperature profile (the dewpoint of water in the reformate flow 14A) is illustrated by line E. At the top of FIG. 3, the fuel processing subsystem 12 operating load is indicated as either full load or 10% load over the designated time periods.

As illustrated in FIG. 3, during the time period $t_1$, the fuel processing subsystem 12 is operating under full load. For this embodiment, the heater 100 is configured to add heat to the process water flow 85 when ever the process water flow 85 temperature $T_B$ exiting the heater 100 is below 80° C. While operating under full load, the temperature of the process water flow 85 after exiting the heater 100 is above the minimum temperature of 80° C. and therefore no heat is added at the heater 100. This indicates that the reformate flow 14A is transferring sufficient heat to the process water flow 85 in the preheater 94 to maintain the process water flow 85 at or above the minimum temperature.

At t=200 seconds, the fuel processing subsystem 12 changes from operating under full load to operating under 10% load. Immediately the temperature of the reformate flow 14A entering (line C) and exiting (line D) the preheater 94 drops significantly. Therefore, the temperature $T_B$ of the process water flow 85 exiting the heater 100 drops because of the decrease in temperature of the reformate flow 14A, and thus a decrease in heat transferred to the process water flow 85 in the preheater 94 from the reformate flow 14A. Immediately, the heater 100 recognizes the temperature $T_B$ of the process water 85 flow exiting the preheater 94 has dropped below the minimum temperature (80° C.) and the heater 100 begins adding heat to the process water flow 85. During the period $t_2$, the heater 100 is adding heat to the process water flow 85 until the temperature $T_B$ of the process water flow 85 exiting the heater 100 is above the minimum temperature, at which point the heater 100 deactivates and stops adding heat.

As shown in FIG. 3, when the fuel processing subsystem 12 changes operating load, the change in temperature $\Delta T_C$ of the reformate flow 14A entering the preheater 94 is not as large as the change in temperature $\Delta T_D$ of the reformate flow 14A exiting the preheater 94. This is because the flow rate of the reformate flow 14A has decreased substantially (approximately an order of magnitude) because of the lower operating load. Under the lower operating load, the fuel processing subsystem 12 is not required to produce as large of a flow rate of the reformate flow 14A as under higher loads. Therefore, the quantity of heat carried by the reformate flow 14A decreases under lower loads. The lower flow rate, and thus the lower quantity of heat is still being utilized to heat the same quantity of process water flow 85 in the preheater 94 because the pump 88 is providing a constant flow rate of the process water flow 85. Therefore, the change in temperature $\Delta T_D$ of the reformate flow 14 exiting the preheater 94 is greater than the change in temperature $\Delta T_C$ of the reformate flow 14 entering the preheater 94.

Additionally, as indicated in FIG. 3, during the time period $t_2$ the temperature $T_B$ of the process water flow 85 exiting the heater 100 is increasing because the heater 100 is adding heat to the process water flow 85. Under 10% load, the fuel processing subsystem 12 does not require as large of a portion 101 of the process water flow 85 and therefore the portion 101 of the process water flow 85 flowing through the outlet flow paths 17 decreases substantially (approximately an order of magnitude) compared to operation under full load. In the illustrated embodiment, the pump 88 is providing the process water flow 85 at a constant flow rate and thus, the flow rate of the remainder 103 of the process water flow 85 increases because of the decreased portion 101 of the process water flow 85 during $t_2$ and $t_3$ (10% load). Because a larger quantity of process water flow 85 is returning to the storage tank 84 as a remainder 103 via the return flow path 104, a smaller quantity of process water flow 85 is required from the process water source 80. Therefore, the temperature $T_A$ of the process water flow 85 in the tank 84 increases relatively rapidly when the heater 100 is adding heat. As a result, the temperature $T_D$ of the reformate flow 14A exiting the preheater 94 increases (during $t_2$) because less heat is transferred to the process water flow 85 as the process water flow 85 temperature $T_A$ entering the preheater increases.

Once the temperature $T_B$ of the process water flow 85 exiting the heater 100 is above the minimum temperature, the heater 100 stops providing heat to the process water flow 85. As shown in FIG. 3, the heater 100 shuts off at around t=390 seconds. During the time period $t_3$, the fuel processing subsystem 12 is continuing to operate under 10% load. The heater 100 is no longer providing heat during this period because the reformate flow 14 entering the preheater 94 is providing sufficient heat to maintain the process water flow 85 above the minimum temperature.

As can be seen in FIG. 3, the change in temperature $\Delta T_{R1}$ of the reformate flow 14A while in the preheater 94 is on the same order as $\Delta T_{C1}$, of the process water flow while in the preheater 94. Referring to time period $t_3$, the change in temperature $\Delta T_{R3}$ of the reformate flow 14A while in the preheater 94 is significantly larger than $\Delta T_{C3}$ of the process water flow while in the preheater 94. This is because the ratio of the flow rate of the reformate flow 14A to the flow rate of the process water flow 85 has significantly decreased when comparing full load to 10% load.

At approximately t=2000 seconds, the fuel processing subsystem 12 is put under full operating load again. As seen in FIG. 3, the temperature of the reformate flow 14A entering ($T_C$) and exiting ($T_D$) the preheater 94 rapidly increases and settles to steady state temperatures as the flow rate of the reformate flow 14A increases with the load change. The temperature $T_B$ of the process water flow 85 exiting the heater 100 also rapidly increases for a brief period as the reformate flow 14A temperatures increase, but falls to a steady state temperature above the minimum temperature as the temperature $T_A$ of the process water flow 85 entering the preheater 94 decreases. The dramatic drop in temperature $T_A$ of the process water flow 85 entering the preheater 94 is because of the change in flow rates of the portion 101 of the process water flow 85 flowing to the fuel processing subsystem 12 via the outlet flow paths 17 and the remainder 103 of the process water flow 85 flowing to the storage tank 80 via the return flow path 104. As the pump 88 is providing a constant flow rate of the process water flow 85, the fuel processing subsystem 12 requires a larger flow rate of the portion 101 of the process water flow 85 which causes an equal decrease in the flow rate of the remainder 103 of the process water flow 85 to the storage tank 84. If the temperature $T_B$ of the remainder 103 of the process water flow 85 flowing to the storage tank 88 remains at approximately the same temperature during various loads (i.e. full load—10% load, as shown in FIG. 3), the temperature $T_A$ of the process water flow 85 entering the preheater 94 will decrease under higher loads because of the increase in the flow rate of the makeup process water from the storage source 80 (so long as the temperature of the process water entering from the storage source 80 is lower than the temperature $T_B$ of the remainder 103 of the process water flow 85).

Thus, it can be seen that in its preferred forms, the process water conditioning system 8 is designed to transfer sufficient heat from the reformate flow 14A to the process water flow 85 to maintain the minimum temperature without the need for additional heat from the heater 100 while the fuel processing system 12 is operating under steady state load conditions, and that the process water conditioning system 8 is also designed to selectively add heat via the heater 100 to the process water flow 85 under transient conditions of the fuel processing subsystem 12 to attain the minimum temperature of the process water 85.

The process water conditioning system 8 of the present invention is capable of dynamic operation to adjust to the various load requirements placed on the fuel processing subsystem 12. While the flow rate of the reformate flow 14A may drop significantly, the process water conditioning system 8 is capable of adjusting the process water flow 85 temperature via the heater 100 to attain the minimum temperature. Additionally, the remainder 103 of the process water flow 85 is recycled via the return flow path 104 to efficiently maintain the added heat within the process water conditioning system 8 as opposed to wasting the heat when the flow requirements change in the fuel processing subsystem 12.

Figure 4:
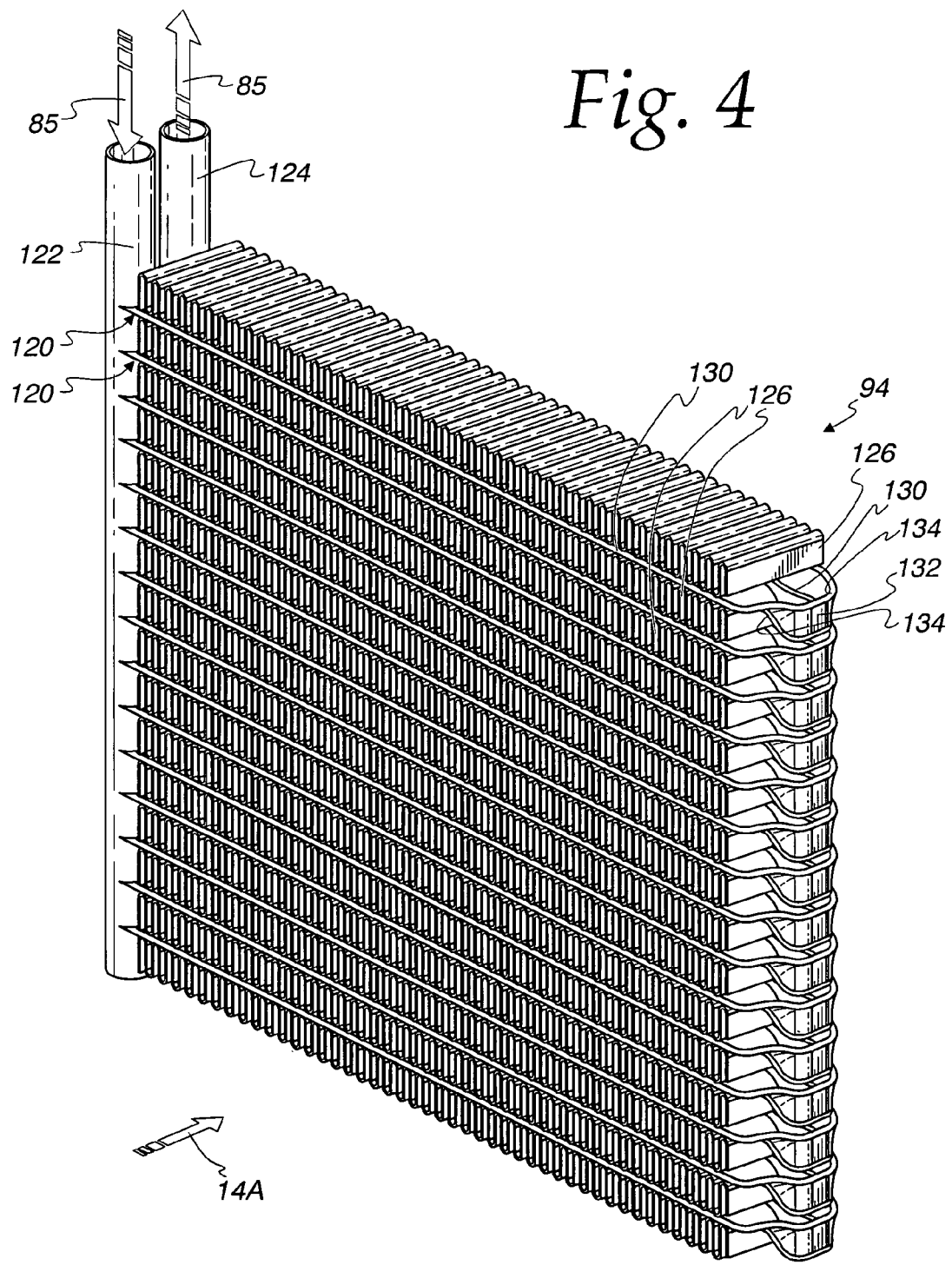
FIG. 4 is a perspective view of an embodiment of a preheater utilized in the present invention.

One highly preferred embodiment for the preheater 94 as shown in FIG. 4. In this preferred embodiment, the preheater is a two-row cross flow heat exchanger, with multiple parallel tubes 120 that define the flow path 95 for the process water flow 85 through the heat exchanger 94 from a cylindrical inlet header 122 to a cylindrical outlet header 124. Serpentine fins 126 extend between each of the tubes 120 to define the flow path 96 for the reformate flow 14A over the exterior of the tubes 120 through the heat exchanger 94. Each of the tubes 120 has a pair of legs 130 connected by a bend 132 via a pair of 90° twist 134 in the tube 120. Because of the relatively low flow rate of the process water flow 85 that will typically be received by the heat exchanger 94, it can become difficult to distribute the process water flow 85 evenly among the multiple parallel tubes 120. In this regard, it desirable to use very small hydraulic diameter (approximately 810 μm) flow passages. Thus, in the highly preferred form, each of the tubes 120 is an extruded aluminum tube with four circular passages of that size evenly distributed along the major axis of the tube. These small flow passages allow for sufficient pressure drop along each of the parallel passages to enforce an even distribution of the process water flow 85, while still keeping the in-tube velocity below the levels at which tube erosion could become a problem. Additionally, the small flow passages allow for a small minor dimension of each of the tubes 120 which provides a large surface area on the reformate side of the heat exchanger 94, enabling a highly compact design.

While FIG. 4 shows one highly preferred embodiment for the heat exchanger 94, it should be understood that any suitable heat exchanger can be used for the heat exchanger 94 and that in some applications other types and constructions may be desirable for the heat exchanger 94. Accordingly, no limitation is intended to the construction shown in FIG. 4 unless expressly recited in the claims.

It should be understood that while the coolant conditioning system 8 is described herein in connection with a fuel processing subsystem 12 that it is particularly advantageous for a fuel cell system, and particularly for proton exchange membrane type fuel cell systems, the coolant conditioning system 8 may find use in any number of fuel processing subsystems including fuel processing subsystems that are not particularly adapted for use with a fuel cell system or a proton exchange membrane fuel cell system. For example, the coolant conditioning system 8 may find use in connection with a fuel processing system that's primary function is to produce hydrogen for use at a hydrogen supply station. Accordingly, no limitation to use with fuel cell systems is intended unless specifically recited in the claims.

The invention claimed is:

1. A coolant conditioning system for supplying a coolant to at least one fuel processing subsystem, the coolant conditioning system comprising:
   a coolant storage tank;
   a pump to supply a coolant flow, the pump including a pump inlet and a pump outlet;
   at least one coolant preheater connected to a reformate flow to transfer heat from the reformate flow to the coolant flow, the at least one coolant preheater including a coolant inlet connected to the pump outlet and a coolant outlet;
   a heater connected to the coolant outlet to selectively add heat to the coolant flow when the temperature of the coolant flow at the coolant outlet falls below a minimum temperature, the heater including a heater inlet for the coolant and a heater outlet for the coolant;
   at least one outlet flow path to direct a portion of the coolant flow from the heater outlet to the at least one fuel processing subsystem; and
   a return flow path to return a remainder of the coolant flow from the heater outlet to the storage tank.

2. The coolant conditioning system of claim 1 wherein the pump supplies the coolant flow at a desired flow rate.

3. The coolant conditioning system of claim 1 wherein the pump supplies the coolant flow at a constant flow rate.

4. The coolant conditioning system of claim 2 wherein a flow rate of the portion of the coolant flow under normal operating conditions is less than the desired flow rate.

5. The coolant conditioning system of claim 1 further comprising at least one pressure regulator downstream from the heater to maintain the portion of the coolant flow to the at least one fuel processing subsystem at a desired pressure.

6. The coolant conditioning system of claim 1 wherein the minimum temperature is the dewpoint temperature of the reformate flow.

7. The coolant conditioning system of claim 1 further comprising a temperature sensor to measure the temperature of the coolant flow exiting the preheater.

8. The coolant conditioning system of claim 7 wherein the heater is responsive to a signal from the temperature sensor.

9. The coolant conditioning system of claim 1 wherein the heater is an electric heater.

10. The coolant conditioning system of claim 1 further comprising a makeup flow path connected to the storage tank to provide additional coolant flow to the storage tank from a coolant source.

11. The coolant conditioning system of claim 10 wherein the coolant source is a recycle flow from a fuel cell system.

* * * * *